United States Patent
Langstrom et al.

(10) Patent No.: US 10,136,382 B2
(45) Date of Patent: Nov. 20, 2018

(54) ARRANGEMENT AT A MOBILE DATA UNIT

(71) Applicants: Mikael Langstrom, Umea (SE); Per Westermark, Umea (SE); Patrick Persson, Umea (SE)

(72) Inventors: Mikael Langstrom, Umea (SE); Per Westermark, Umea (SE); Patrick Persson, Umea (SE)

(73) Assignee: Fält Communications AB, Umeå (SE)

( * ) Notice: Subject to any disclaimer, the term of this patent is extended or adjusted under 35 U.S.C. 154(b) by 0 days.

(21) Appl. No.: 15/200,413

(22) Filed: Jul. 1, 2016

(65) Prior Publication Data

US 2017/0078958 A1    Mar. 16, 2017

Related U.S. Application Data

(63) Continuation of application No. 13/926,415, filed on Jun. 25, 2013, now abandoned, and a continuation of application No. 11/665,413, filed as application No. PCT/SE2005/001517 on Oct. 12, 2005, now abandoned.

(30) Foreign Application Priority Data

Oct. 14, 2004    (SE) .................................... 04025052

(51) Int. Cl.
*H04W 48/18*    (2009.01)
*H04W 48/16*    (2009.01)
*H04W 52/02*    (2009.01)
*H04W 8/02*    (2009.01)
*H04W 4/70*    (2018.01)

(52) U.S. Cl.
CPC ............. *H04W 48/18* (2013.01); *H04W 8/02* (2013.01); *H04W 48/16* (2013.01); *H04W 52/0235* (2013.01); *H04W 4/70* (2018.02); *Y02D 70/1224* (2018.01); *Y02D 70/1242* (2018.01); *Y02D 70/164* (2018.01)

(58) Field of Classification Search
CPC ..... H04W 48/16; H04W 48/18; H04W 4/005; H04W 52/0235; H04W 8/00; Y02B 60/50
See application file for complete search history.

(56) References Cited

U.S. PATENT DOCUMENTS

2006/0171523 A1*    8/2006   Greenwell .............. H04W 4/00
                                                        379/242

\* cited by examiner

*Primary Examiner* — Diane Mizrahi
(74) *Attorney, Agent, or Firm* — Ladas & Parry LLP; Malcolm J. MacDonald

(57) ABSTRACT

The invention is based on a platform that has both hardware and software. The latter includes, amongst other things, an algorithm to solve the problem encountered when, on passing between countries and operators, data services have to roam between mobile networks. The invention handles and solves existing technical limitations such as existing roaming logic for switches between operators not taking into account: which services the 'original' operator has activated; geographical coverage; different costs for different services; and, whether services other than speech can function in the selected network.

35 Claims, 6 Drawing Sheets

ARRANGEMENT AT A MOBILE DATA UNIT

This application is a continuation of U.S. Ser. No. 13/926,415, filed Jun. 25, 2013, which is a continuation of U.S. Ser. No. 11/665,413, filed Apr. 20, 2009, which is a 371 application of International Application No. PCT/SE2005/001517, filed on Oct. 12, 2005, which claims priority to Swedish Application No. 0402505-2, filed on Oct. 14, 2004 which are all incorporated by reference herein.

BACKGROUND

At present, when using mobile communication, whether it be for speech or data, problems arise when geographic movement results in switches between operators. This is particularly the case when national boundaries are crossed.

Existing roaming logic for switches between operators does not, for example, take into account:
Which services (speech or various data configurations) the "original" operator has activated.
Geographical coverage.
Different costs for different services.
Whether services other than speech can function in the selected network.

On the whole, existing roaming logic has been developed for speech communication and, as a result, there are certain shortcomings when communication is between machines.

The mobile data services offered in today's mobile data networks handle roaming both in the national network and internationally. The latter is handled by the operator concluding contracts with, most usually, a number of operators in other countries.

When, for example, the Global System for Mobile Communications (GSM) was launched, speech was and, to a large extent, still is the only or the most common use. With operators and telecom suppliers increasing their range of services (e.g. Multimedia Messaging Service (MMS), General Packet Radio Service (GPRS), Enhanced Data Rate of GSM Evolution (EDGE) and Universal Mobile Telephone system (UMTS)), roaming has become more complex.

When a subscription leaves the "original" operator's national network and enters a different country, the roaming logic built into telephones and Subscriber Identifier Module (SIM) cards searches for the operators with which the original operator has agreements. A selection amongst operators that the telephone comes into contact with is then made.

If operator A has agreements with B, C, D and E in a foreign country, the choice of operator B, C, D or E is, when the subscription changes countries, random. If the application is speech, then roaming will, in all probability, be successful.

However, if the application is, for example, MMS, GPRS, EDGE or UMTS, then the selected foreign operator must have support for the technology in question.

The identified difficulties hinge on the mobile service user not being able to control operator choice so as to achieve optimum results when confronted by the problems outlined below.

Problem 1 is where operators C, D and E support the required technology, but operator B does not. Thus, if the subscription from operator A roams to B, then the application will not work. Because the existing roaming logic in operators' networks and in SIM cards does not take support for various technologies into account, the subscription will stay with operator B.

Problem 2 is where operators have different prices for their services. For example, the subscription with original operator A roams, by chance, to operator C. The service works, but operators D and E are considerably cheaper than C and would thus be the logical choice.

Problem 3 is where, for strategic reasons, operators have different geographical coverages. For example, operator D covers 95% of a country, whereas operator E covers only 50% of this country. Given equal service charges, the logical choice is, of course, operator D. However, with existing roaming logic, the subscription's choice of operator is random.

In all probability, virtual operators will solve problem 1 by allowing their subscriptions to roam only to those operators who support the requisite technologies. However, problems 2 and 3 remain.

If it is assumed that, to overcome roaming problem 1, virtual operators select only one operator in each country, then this solution has the disadvantage that the application will not work if the selected operator's service goes down.

The problem of inadequate roaming technology became clear when vans/trucks were equipped for monitoring certain transport movements in which the cargo space was to be kept security sealed and the objective was to follow the vehicle's physical movements from a supplier in one country to a recipient in another.

SUMMARY OF THE INVENTION

Using the communication services platform described in the present application, the present invention solves the above problem by finding an operator who provides services that handle data communication (e.g. machine to machine). The platform is dynamic and independent of the form of communication. If the platform has a local network on the vehicle, then cameras, alarm sensors, other detectors, indicators, etc. can be monitored as desired. Similarly, if a GPS receiver is connected into the network, position data can be relayed. The platform's software handles data service roaming and, specifically, data-to-data communication in mobile networks when moving between countries and operators.

It is common for goods to be transported by trucks. The value and properties of the goods may be of such a nature that the haulier wishes to monitor their transport. The truck can then be equipped with the platform described in this application (a mobile data unit) that is connected to various modules, e.g. a telephone module that transmits the parameters to be monitored and a GPS module for continuous following of the truck's physical position. When national boundaries are passed, the services offered by operators often change.

Unfortunately, today's roaming algorithms are optimized for speech. However, the algorithm system described in this patent prioritizes data communication (i.e. machine to machine) and handles it optimally.

For tracking missing goods, hauliers may wish to monitor, for example, when the cargo space is opened. Both time and place can be monitored by having (in the network) sensors that register door opening or the breaking of the security seal. Additionally, the mobile data unit can receive other important information for transmission to selected receivers. It would be possible to measure distance driven so that, as the vehicle approaches a service unit, services could be ordered. Similarly fuel consumption could be measured and filling suggested at suitable stations with contracted suppliers.

Trucks with separate trailers are often used for goods transport. Hauliers with many vehicles can find it difficult to keep track of where all their trailers are at any one time. When it is separated from the tractor unit and the driver, each trailer becomes anonymous and it is often problematic to pinpoint its physical location. Such trailers can be equipped with a mobile data unit (as described and defined in this patent) containing a GPS module and a power backup so that, when the tractor unit leaves the trailer, the haulier can easily track the trailer and discover its position. Furthermore, driver changes and driving times can, if so wished, be recorded. The transport of certain goods, e.g. chilled wares, can require continuous or regular monitoring of temperatures.

DETAILED DESCRIPTION OF THE INVENTION

Description of the Platform

Figure 1:
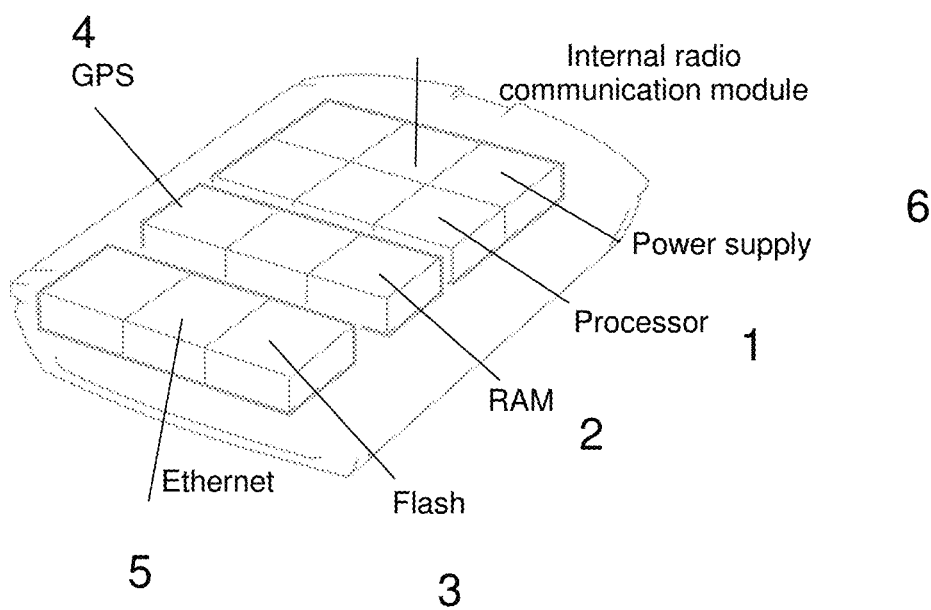
FIG. 1 shows the modular structure of the platform that forms a mobile data unit.

Referring to FIG. 1, the platform can be simply described as a modularly constructed electronic apparatus, the modules of which can be chosen to answer the unique needs of the desired application. For example, the platform can comprise: a processor (1); various types of memory, e.g. Random Access Memory (RAM) (2) and flash (3); a Global Positioning System (GPS) module (4); an Ethernet (5); a power supply (6); and, various digital and analogue inputs. The software contains the unique algorithms that are critical for the functionality of the invention.

Figure 2:
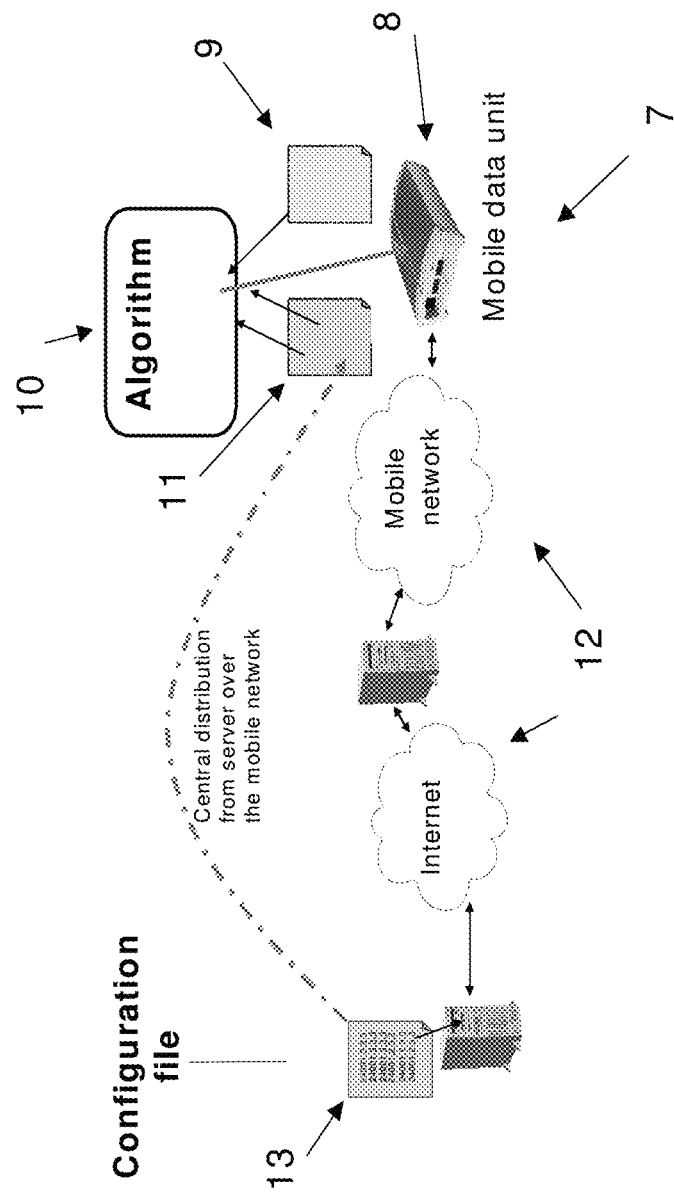
FIG. 2 is a schematic of communication and algorithm processing.

FIG. 2 gives an example and description of a mobile application. A mobile data unit (7) moves out of the area covered by the system and operator it the unit has most recently used. The software (8) identifies the break in the mobile data service. This activates the algorithm for system and operator dependent roaming. A new mobile data session for continued Internet Protocol (IP) communication (12) from to/the mobile data unit (7) is established.

The algorithm (10) starts by identifying available systems and operators. To choose between available systems/operators, the algorithm uses both the centrally (server) downloaded configuration parameters (11) and the local, empirical parameters from previous attempts (9). It chooses the system and operator that has the highest priority. The algorithm makes one or a number (configurable parameter) of attempts to establish a new data session with the selected system and operator. If a session cannot be established, the algorithm chooses the system and operator that has the next highest priority. This is repeated until a mobile data session is established. All failed and successful attempts to establish sessions are used to update the empirical information that is stored locally in the mobile data unit. This information is used in future attempts to establish mobile data sessions from the place in question.

Figure 3A:
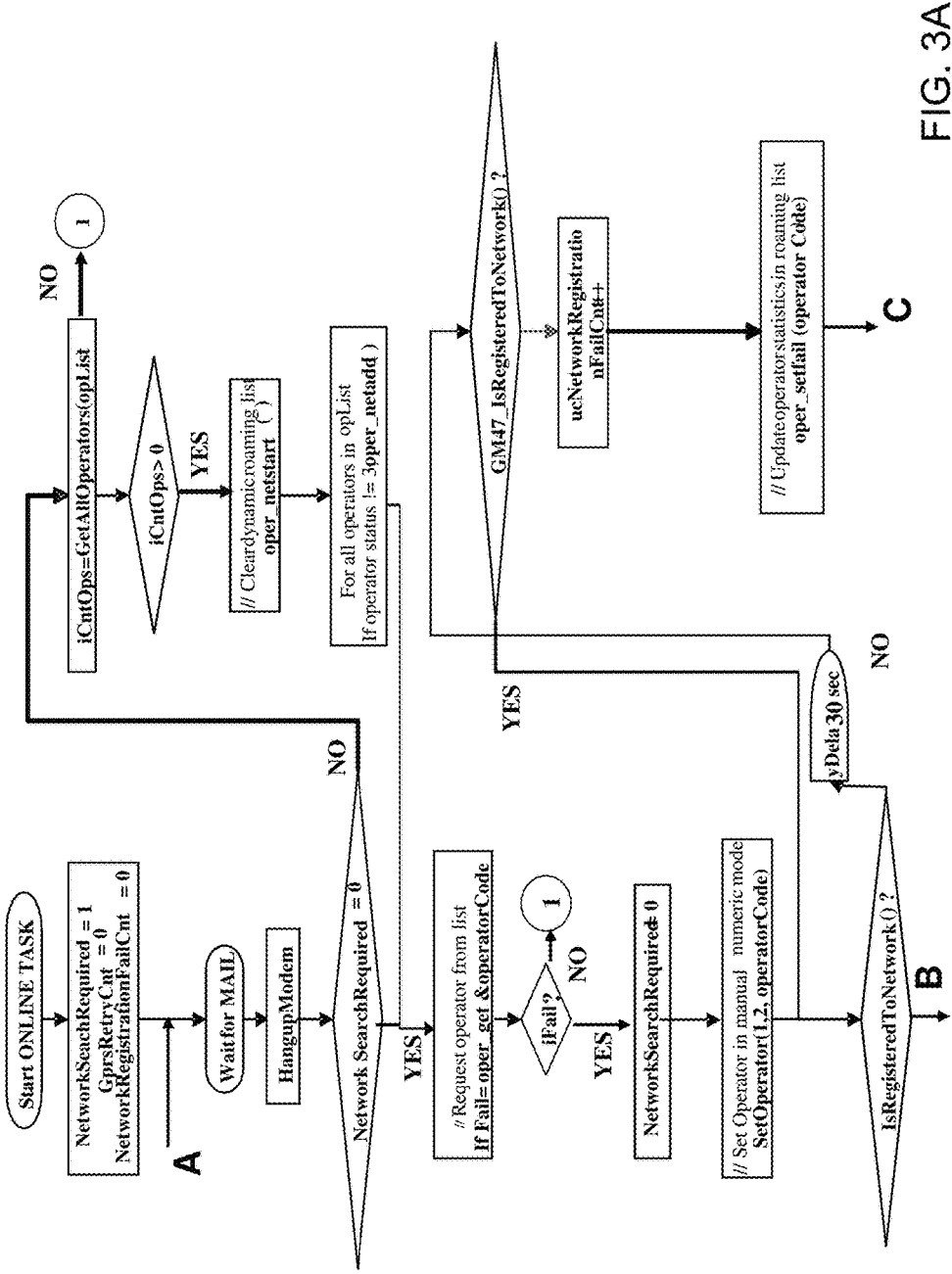
FIGS. 3A and 3B show example algorithms.
Figure 3B:
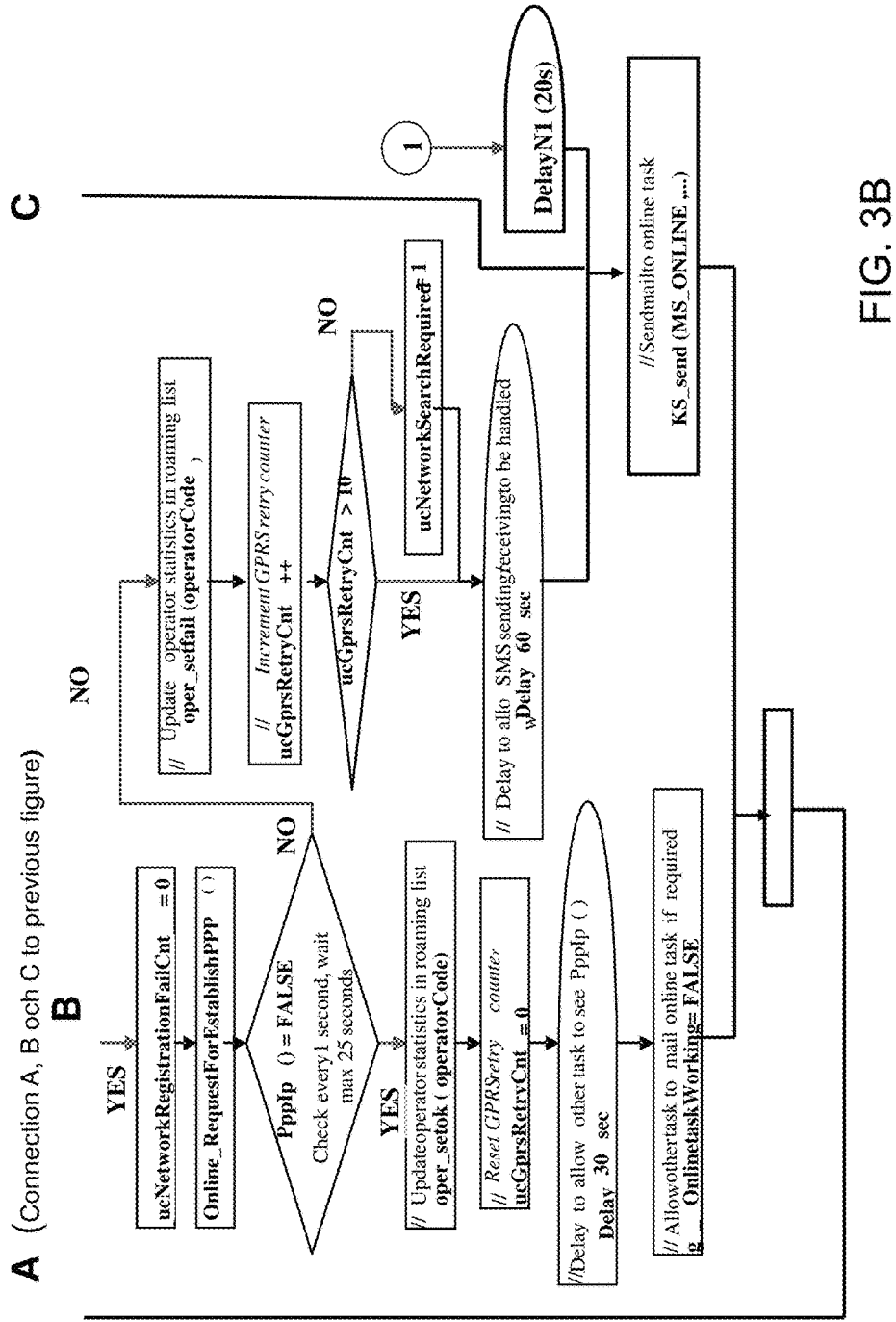

FIG. 3 gives an overview of the entire schematic flow for an algorithm.

The algorithm for operator selection in mobile data service roaming has two parts:

A configuration part that comprises a list of operators. This is downloaded to the mobile data unit from a server. The list has the following fields:

Operator code—e.g. the mobile network code (MNC) if communication is via GSM.

"Blocked flag"—a flag indicating whether use of an operator is permitted.

Weighting—a decimal value (integer) used by the self-learning algorithm to weight the priority for a certain operator. The mobile data unit uses this information to determine, in the self-learning part, whether or not an operator may be used. Where it is known in advance that certain operators in a country have better coverage or lower prices, the weighting is also used to direct the mobile data unit to advantageously use certain operators.

A self-learning part that comprises a further list. This is created dynamically as, in the attempt to establish mobile data roaming, the mobile data unit fails or succeeds with each operator change. Each time the mobile data unit has to establish a mobile data session (i.e. at restarts or when the mobile data service is lost), a check is made (by asking the mobile data module) of the operators available in the current area. If they are not already there, the available operators are entered into the dynamic list.

Before an operator is added to the dynamic list, the configuration list downloaded from the server is checked to see whether use of the operator is permitted. The weighting is also copied into the dynamic list. Next, the operator with the highest priority in the dynamic list is retrieved. The mobile data unit then attempts to establish a mobile data session with this selected operator. If it fails to connect to the operator or to set up a session, the operator's priority is adjusted downwards by altering the weighting. In this way, the dynamic list's prioritization has a self-learning function (inasmuch as the value that indicates priority contains an empirical measure of how well an operator functions in a certain country). The dynamic list thus has the following fields:

Operator code

"Blocked flag"

Weighting

Priority

One function that is of great importance for mobile applications is the possibility of limiting the current drawn by the mobile data unit when it the unit is using a battery as it a sole power source. This is based on two (configurable) levels being downloaded from a server. These levels set:

The voltage level to start the mobile data unit when it has gone into a power management mode.

The voltage level to go into a power management mode.

Where the function is activated in the configuration downloaded from the server, the mobile data unit continuously monitors the voltage level of the source from which it takes its power. When the voltage feed falls below the level set in the configuration downloaded from the server, the mobile data unit signals the server that it is going into a power management mode. All the mobile data unit's unnecessary power-consuming functions (e.g. main processor, mobile module, other interfaces, etc.) are shut down and only a minimum number of components are allowed to be energized. These are the components necessary for monitoring voltage levels and alarm inputs. They also handle restarting of all the mobile data unit's essential functions.

When the mobile data unit is in a power management mode, it the unit is only allowed to "restart" if:

The voltage level exceeds the configured (i.e. previously downloaded from a server) "restart" level.

Any of the mobile data unit's active alarm inputs has an active alarm.

A preset timer function (60 seconds up to 1 year) activates a temporary "restart".

If an alarm "restarts" the mobile data unit, the alarm is sent to a server. Once the alarm has been acknowledged, the terminal returns to a power management mode. If a timer function "restarts" the mobile data unit, the mobile data unit signals the unit's position (or, if there is no positioning, simply the unit's existence) and then returns to a power management mode. The timer interval to be used can be downloaded from a server (it should be possible to set this from 60 seconds to 365 days).

Another function that is of great importance for mobile applications is the possibility of sending an alarm that also contains position information. It should be possible for alarms to be activated by various types of "alarm indicators", e.g.: door sensors in trucks/trailers; wireless personal-safety alarm buttons; hardwired alarm buttons; level sensors. This would require the mobile data unit to have support for an array of alarm inputs and for managing the activation and resetting of these. The mobile data unit should also offer the function of sending (via the mobile data channel) these alarms with position indication (from a GPS receiver built into the mobile unit) and handling the acknowledgement message from the receiving unit (server).

For the receiving side to be able to ensure that the mobile unit is active and has not been subjected to any form of sabotage or operational interference, the mobile data unit should also continuously send, at predetermined intervals, a connection monitoring message (containing position indication). If these messages were not sent, the receiving unit (server) could trigger a connection alarm that gave the last known position and the associated time. Where the mobile data unit has these two functions, it the unit can be used for a whole range of mobile security applications.

These two functions (alarm inputs and connection monitoring messages) could be configured from the receiving unit (server) and updated via the mobile data unit's data channel.

Figure 4:
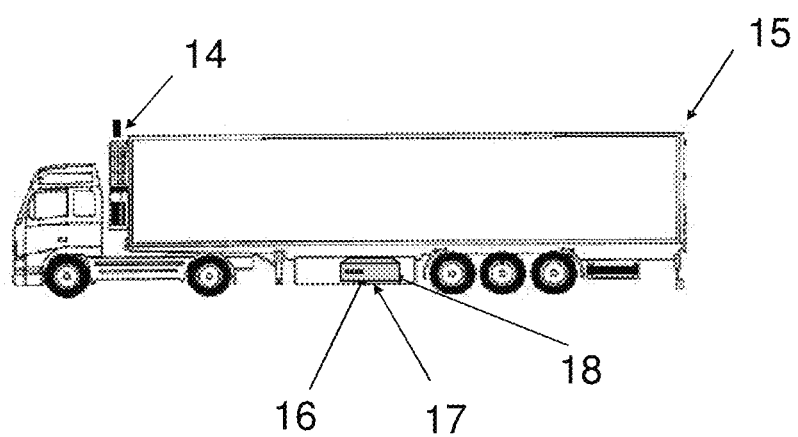
FIG. 4 shows an application for trucks.

FIG. 4 shows how the mobile data unit (16) could be installed in a trailer application. Communication and GPS aerials (14) are sited on the trailer unit's roof. Sensors (15) that register door opening send door position related signals to the data unit (16). Along with the mobile data unit (16), a GPS receiver, other electronics and a power unit (17) are built into an equipment box (18).

Figure 5:
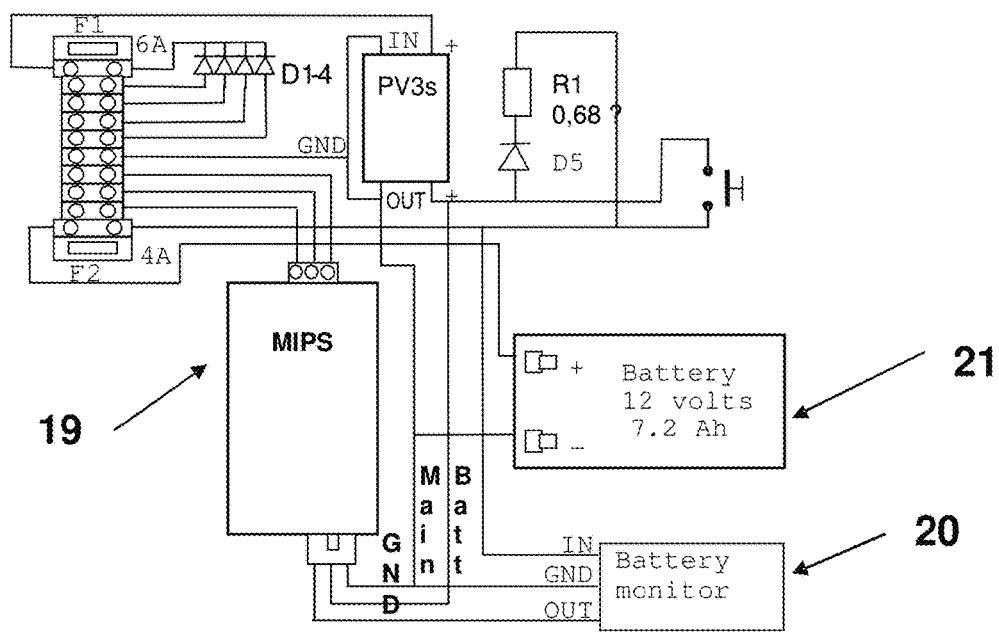
FIG. 5 shows a connection diagram for power supply and battery backup in the application for trucks.

FIG. 5 shows how the mobile data unit (19) could be electrically connected to a battery monitor (20) and battery (21).

The concrete application detailed in this document centres on the need for reliable communication between a vehicle and its proprietors, said communication not being affected by today's shortcomings in service offerings.

The application is in no way restricted to this physical application. The latter is used solely as an example of the practical use of the invention. The application can be used on land, at sea and in the air—wherever the same phenomenon arises on passage between areas covered by different operators.

What is claimed is:

1. A method to implement roaming between mobile telephone networks, the method comprising:

implementing the roaming method locally in a mobile unit;

searching for an available mobile telephone network;

choosing a mobile telephone network based on a number of parameters selected from the group consisting of available services, tariffs, coverage, and priority parameters;

a self-learning part that adjusts a priority parameter of the mobile telephone network downwards, by altering a weighting, when the mobile unit fails to connect to the mobile telephone network, or fails to set up a session;

wherein said mobile unit monitors parameters and information related to driver behavior in the form of distances driven, speeds, and rest periods.

2. The method according to claim 1, further comprising testing an ability of the connected mobile telephone network to receive and send a data format.

3. The method according to claim 1, comprising sending data from the mobile unit, wherein formats of the data depend on information being requested, or the services being provided or used.

4. The method according to claim 1, comprising sending information from the mobile unit, said information being selected from the group consisting of geographical position, time data, data from monitoring sensors, and data from a camera.

5. The method according to claim 4, wherein said data from monitoring sensors is temperature data or door opening data.

6. The method according to claim 4, wherein said data from a camera comprises data from still pictures or moving pictures.

7. The method according to claim 4, wherein said data from monitoring sensors is temperature data, or door opening data.

8. The method according to claim 1, wherein the mobile unit is put into a power saving mode, and wherein the mobile unit is able to initiate leaving the power saving mode.

9. The method according to claim 8, wherein the leaving of the power saving mode occurs at selected time points, or upon a request of a monitored function.

10. The method according to claim 9, wherein said request is generated by a door sensor or a temperature limit.

11. A method to implement roaming between mobile telephone networks, the method comprising:

implementing the roaming method locally in a mobile unit;

searching for an available mobile telephone network;

choosing a mobile telephone network based on a number of parameters selected from the group consisting of available services, tariffs, coverage, and priority parameters;

a self-learning part that adjusts a priority parameter of the mobile telephone network downwards, by altering a weighting, when the mobile unit fails to connect to the mobile telephone network, or fails to set up a session;

wherein said mobile unit monitors parameters and information related to an engine of a vehicle.

12. The method according to claim 11, wherein said mobile unit monitors fuel consumption of the engine.

13. The method according to claim 11, further comprising testing an ability of the connected mobile telephone network to receive and send a data format.

14. The method according to claim 11, comprising sending data from the mobile unit, wherein formats of the data depend on information being requested, or the services being provided or used.

15. The method according to claim 11, comprising sending information from the mobile unit, said information being selected from the group consisting of geographical position, time data, data from monitoring sensors, and data from a camera.

16. The method according to claim 15, wherein said data from a camera comprises data from still pictures, or moving pictures.

17. The method according to claim 11, wherein the mobile unit is put into a power saving mode, and wherein the mobile unit is able to initiate leaving the power saving mode.

18. The method according to claim 17, wherein the leaving of the power saving mode occurs at selected time points, or upon a request of a monitored function.

19. The method according to claim 18, wherein said request is generated by a door sensor, or a temperature limit.

20. A method to implement roaming between mobile telephone networks, the method comprising:
    implementing the roaming method locally in a mobile unit;
    searching for an available mobile telephone network;
    choosing a mobile telephone network based on a number of parameters selected from the group consisting of available services, tariffs, coverage, and priority parameters;
    a self-learning part that adjusts a priority parameter of the mobile telephone network downwards, by altering a weighting, when the mobile unit fails to connect to the mobile telephone network, or fails to set up a session; and
    sending temperature data or door opening data received from a monitoring sensor.

21. The method according to claim 20, further comprising testing an ability of the connected mobile telephone network to receive and send a data format.

22. The method according to claim 21, wherein said mobile unit monitors parameters and information related to driver behavior in the form of distances driven, speeds, and rest periods.

23. The method according to claim 20, comprising sending data from the mobile unit, wherein formats of the data depend on information being requested, or the services being provided or used.

24. The method according to claim 20, wherein the mobile unit is put into a power saving mode, and wherein the mobile unit is able to initiate leaving the power saving mode.

25. The method according to claim 24, wherein the leaving of the power saving mode occurs at selected time points, or upon a request of a monitored function.

26. The method according to claim 25, wherein said request is generated by a door sensor, or a temperature limit.

27. A method to implement roaming between mobile telephone networks, the method comprising:
    implementing the roaming method locally in a mobile unit;
    searching for an available mobile telephone network;
    choosing a mobile telephone network based on a number of parameters selected from the group consisting of available services, tariffs, coverage, and priority parameters;
    a self-learning part that adjusts a priority parameter of the mobile telephone network downwards, by altering a weighting, when the mobile unit fails to connect to the mobile telephone network, or fails to set up a session;
    wherein the mobile unit is put into a power saving mode, and wherein the mobile unit is able to initiate leaving the power saving mode; and
    wherein the leaving of the power saving mode occurs at selected time points, or upon a request of a monitored function.

28. The method according to claim 27, further comprising testing an ability of the connected mobile telephone network to receive and send a data format.

29. The method according to claim 27, comprising sending data from the mobile unit, wherein formats of the data depend on information being requested, or the services being provided or used.

30. The method according to claim 27, comprising sending information from the mobile unit, said information being selected from the group consisting of geographical position, time data, data from monitoring sensors, and data from a camera.

31. The method according to claim 30, wherein said data from monitoring sensors is temperature data, or door opening data.

32. The method according to claim 31, wherein said data from a camera comprises data from still pictures or moving pictures.

33. The method according to claim 27, wherein said mobile unit monitors parameters and information related to an engine of a vehicle.

34. The method according to claim 33, wherein fuel consumption of the engine is monitored.

35. The method according to claim 27, wherein said request is generated by a door sensor, or a temperature limit.

* * * * *